US012750636B2

(12) United States Patent
Srivastava et al.

(10) Patent No.: US 12,750,636 B2
(45) Date of Patent: Sep. 29, 2026

(54) USING MULTIPLE GEOFENCES TO INITIATE RECORDING DEVICES

(71) Applicant: Axon Enterprise, Inc., Scottsdale, AZ (US)

(72) Inventors: Anshuman Srivastava, Woodinville, WA (US); Jeffrey Kunins, Seattle, WA (US); Prasetha Warrier, Bellevue, WA (US); Rafael Lopez-Uricoechea, Seattle, WA (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 152 days.

(21) Appl. No.: 18/727,719

(22) PCT Filed: Jan. 10, 2023

(86) PCT No.: PCT/US2023/010485
§ 371 (c)(1),
(2) Date: Jul. 10, 2024

(87) PCT Pub. No.: WO2023/133348
PCT Pub. Date: Jul. 13, 2023

(65) Prior Publication Data

US 2025/0071509 A1 Feb. 27, 2025

Related U.S. Application Data

(60) Provisional application No. 63/298,147, filed on Jan. 10, 2022.

(51) Int. Cl.
*H04W 4/021* (2018.01)
*H04W 4/70* (2018.01)
(Continued)

(52) U.S. Cl.
CPC ............ *H04W 4/021* (2013.01); *H04W 4/70* (2018.02); *H04W 4/90* (2018.02); *H04W 40/20* (2013.01)

(58) Field of Classification Search
CPC ........ H04L 67/53; H04L 67/55; H04W 4/021; H04W 4/022; H04W 4/10; H04W 4/12;
(Continued)

(56) References Cited

U.S. PATENT DOCUMENTS

| | | | |
|---|---|---|---|
| 2017/0006448 | A1 | 1/2017 | Igumnov et al. |
| 2017/0294131 | A1 | 10/2017 | Jedrzejewski et al. |

(Continued)

FOREIGN PATENT DOCUMENTS

KR 10-2016-0084112 A 7/2016

OTHER PUBLICATIONS

European Patent Office Search Opinion for Application No. EP 4464047 A1, Nov. 26, 2025 (Year: 2025).*
(Continued)

*Primary Examiner* — Nader Bolourchi
(74) *Attorney, Agent, or Firm* — Carmel Zhao; Andrew Graham

(57) ABSTRACT

A system comprises a server and a plurality of recording devices. The system receives location data from the plurality of recording devices. The server may additionally receive a call for service, the call for service having location data for the call for service. The server determines, based on the location data, a safety radius comprising a first area around a location of the call for service and identifies one or more recording devices of the plurality of recording devices having location data inside the determined safety radius. The server transmits geofence information to the one or more recording devices. Responsive to a recording device of the one or more recording devices entering an activation radius
(Continued)

determined in accordance with the geofence information, the recording device initiates recording.

20 Claims, 5 Drawing Sheets

(51) Int. Cl.
*H04W 4/90* (2018.01)
*H04W 40/20* (2009.01)

(58) Field of Classification Search
CPC ......... H04W 4/70; H04W 4/90; H04W 40/20; H04W 88/18
See application file for complete search history.

(56) References Cited

U.S. PATENT DOCUMENTS

| | | | |
|---|---|---|---|
| 2019/0087754 | A1 | 3/2019 | Farrelly et al. |
| 2019/0158979 | A1 | 5/2019 | Jurzak et al. |
| 2021/0274307 | A1 | 9/2021 | Dym et al. |
| 2021/0297807 | A1 | 9/2021 | Brady |
| 2022/0004973 | A1 | 1/2022 | Truong et al. |

OTHER PUBLICATIONS

The International Bureau of WIPO, Notification Concerning Transmittal of International Preliminary Report on Patentability for International Application No. PCT/US23/10485 mailed Jul. 25, 2024.

* cited by examiner

USING MULTIPLE GEOFENCES TO INITIATE RECORDING DEVICES

FIELD OF THE INVENTION

Embodiments of the present invention relate to recording devices. Specifically, embodiments relate to generating and using multiple geofences to initiate recording devices in a field.

BRIEF DESCRIPTION OF THE SEVERAL VIEWS OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Figure 1:
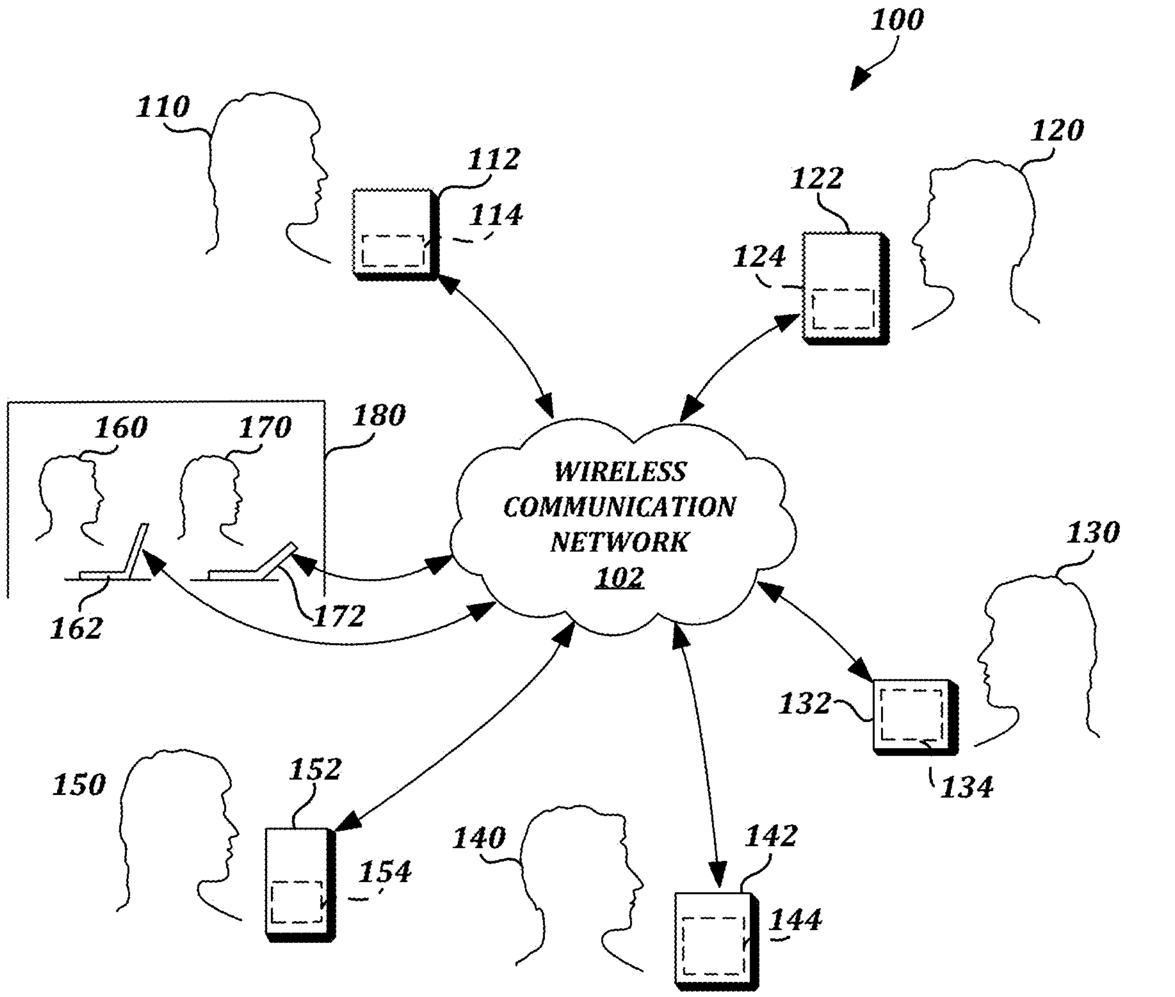
FIG. 1 is an embodiment of a system for communication between computing devices of responders via a network, in accordance with various embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the present disclosure are generally directed to techniques and tools for generating and using geofences to activate cameras of computing and/or recording devices of responders. A responder is any individual that is part of an agency that responds to particular situations or incidents. Examples of responders include law enforcement officials, firefighting officials, paramedics, private security personnel, private responders (e.g., tow truck drivers and roadside assistance personnel), and the like. Law enforcement officials include police officers, sheriffs and sheriff deputies, state patrol officers, federal agency officers (e.g., Federal Bureau of Investigation agents, Central Intelligence Agency agents, Transportation Security Administration officers, etc.), members of the National Guard, members of the armed forces, and the like. Examples of responders also include supervisors (e.g., police sergeants) and dispatchers of other responders. Examples of responder agencies include police departments, sheriff offices, fire departments, federal agencies, private companies of private security personnel and private responders, and the like.

Calls for service may comprise phone calls, emails, text alerts or notifications, or other communications describing an incident requiring responder action. In some embodiments, calls for service identify at least a location of an incident requiring responder action. In some embodiments, calls for service may additionally comprise call information describing one or more of: a category of the incident, a priority level of the incident, a time of day or timestamp of the incident, or a jurisdiction or agency corresponding to the incident. In some examples, calls for service may be generated by emergency calls, e.g., reports of car collisions or other incidents by the public. In other examples, calls for service may be generated responsive to deployment of weapons, e.g., responsive to a firearm being deployed. In other examples, calls for service may be generated by other means and/or by other entities.

It is valuable for responders to receive information describing calls for service quickly when they are generated. However, not all calls for service may be relevant to all responders within an environment. Responders may be more or less likely to respond to a call for service based on a number of factors, such as proximity to the call for service, assignments to other incidents or duties, categories, types, or agencies associated with the call for service, and numerous other factors. As such, it is valuable for a server or other computing device to determine sets of responders to receive information describing calls for service.

It is additionally valuable for responders to initiate recording functions of responder devices while responding to a call for service. Record data may be captured, processed and stored by responder devices and/or by server in association with the call for service. The record data may capture information valuable to assessing and understanding the call for service and/or an associated incident. A recording device may be manually activated by a responder, such as via a button push or voice command, or may be automatically activated based on a signal received by the recording device. However, the recording device may fail to initiate recording responsive to a number of factors, such as responder failing to manually initiate recording functions or the recording device failing to receive a signal from a nearby device.

Methods, devices, and systems for initiating recording devices are set forth herein. Embodiments according to various aspects of the present disclosure comprise one or more of determining a plurality of responder devices based on a first geofence, transmitting information describing a call for service to the plurality of responder devices, and initiating recording by one or more responder devices of the plurality of responder devices responsive to being within a second geofence corresponding to a location of the call for service. Multiple geofences enable a remote computing device of a system to transmit information describing calls for service to multiple responder devices that may respond to calls for service. Responder devices may automatically initiate recording based on geofences, enabling responder devices to capture relevant record data for the call for service while additionally ensuring that responder devices do not initiate recording unnecessarily, which may decrease battery life or capture unnecessary record data. By determining the plurality of responders and responder devices, distraction can be avoided by not transmitting the information regarding the call for service to one or more responder devices that are in communication with a remote computing device but not proximate to the location of the call for service. Further, the battery power of a responder device otherwise required to receive a push notification comprising the information may be preserved. Embodiments according to various aspects of the present disclosure provide various technical advantages, including the preservation of communication channels and battery power of portable recording devices that might otherwise be consumed with transmission and receipt of unnecessary and irrelevant notifications. Such advantages are provided while still ensuring that responder devices proximate the location of the call for service receive sufficient information in order to subsequently appropriately respond to the call for service. In some embodiments, methods, devices, and systems are additionally described that comprise one or more of: transmitting information describing calls for service to additional responder devices at a later time, dynamically updating one or more geofences, performing processing and/or storing record data, and the like.

In the following description, the terms "responder device," "computing device," and "recording device" may be used interchangeably. It will be apparent to one skilled in the art that each of these terms refers to a primary or accessory device operated by a responder as identified above, the device comprising one or more processing elements and configured to capture record data, e.g., video, audio, or photographical data, responsive to initiating recording.

In the following description, numerous specific details are set forth in order to provide a thorough understanding of illustrative embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein. The illustrative examples provided herein are not intended to be exhaustive or to limit the claimed subject matter to the precise forms disclosed.

FIG. 1 depicts an embodiment of a system 100 for communication between computing devices of responders via a network 102. The system includes a responder 110 that has a computing device 112 that is configured to communicate via the network 102. In some embodiments, the network 102 is a wireless communication network using one or more wireless communication protocols, such as WiFi, 2G, 3G, 4G, LTE, WiMAX, Bluetooth, and the like. In the depicted embodiment, the computing device 112 includes a communication application 114 that includes instructions that cause the computing device 112 to establish a communication link between computing devices of other responders via the network 102. In some embodiments, the communication links described herein are peer-to-peer communication links. In other embodiments, the communication links described herein are server-mediated communication links. In other embodiments, the communication links described herein use one or more protocols, such as the internet protocol, mobile telephony protocols, push-to-talk over cellular protocols, and the like.

In some embodiments, the system 100 also includes responders 120, 130, 140, and 150. Each of the responders 120, 130, 140, and 150 has one of computing devices 122, 132, 142, and 152 that are capable of communicating via the network 102. Each of the computing devices 122, 132, 142, and 152 includes one of the communication applications 124, 134, 144, 154 that includes instructions that cause the computing devices 122, 132, 142, and 152 to establish a communication link between computing devices of other responders via the network 102. Each of the computing devices 122, 132, 142, and 152 may comprise a portable and/or mobile computing device that may be relocated to an incident or location.

In the depicted embodiment, the system 100 also includes a responder 160 and a responder 170 located at one or more remote locations 180. Each of the responder 160 and the responder 170 is located in a remote location 180, such as a responder agency office, dispatch unit, and the like. The responder 160 has a computing device 162 and the responder 170 has a computing device 172. Each of the computing devices 162 and 172 is configured to communicate via the network 102. Each of the computing devices 162 and 172 includes a communication application that includes instructions that cause the computing devices 162 and 172 to establish a communication link between computing devices of other responders via the network 102. In one embodiment, the responder 160 is a dispatcher of one or more of the responders 110, 120, 130, 140, and 150. In another embodiment, the responder 170 is a supervisor of one or more of the responders 110, 120, 130, 140, and 150.

In other embodiments, one or more computing devices 162, 172 may comprise a remote computing device. The remote computing device may comprise a server, cloud computing device, or other remote device performing one or more automated tasks or functions. For example, computing device 162, 172 may comprise a server configured to receive calls for service and to perform one or more processing functions to categorize or respond to the received calls for service. In some embodiments, computing devices 162, 172 may receive calls for service via communication link between computing devices of other responders via the network 102. In other embodiments, computing devices 162, 172 may receive calls for service via other communication methods, e.g., via phone calls, emails, text messages, or the like, from one or more additional sources or entities (e.g., non-responder computing device, cellular telephone, landline telephone, alarm system, etc.) not depicted in FIG. 1.

In some embodiments, each of the computing devices 112, 122, 132, 142, 152, 162, and 172 includes one or more of a cell phone, tablet computer, smart wearable (e.g., a smart watch), a laptop computer, a desktop computer, a server, a cloud computing device, and the like. In one example, the computing devices 112, 122, 132, 142, and 152 are personal devices of the responders 110, 120, 130, 140, and 150 and are not issued by any responder agency of the responders 110, 120, 130, 140, and 150. In that case, the communication applications 114, 124, 134, 144, and 154 are configured to enable communication between the personal computing devices 112, 122, 132, 142, and 152 of the responders 110, 120, 130, 140, and 150 with each other and with computing devices of one or more responder agencies, such as computing devices 162 and 172. In other embodiments, one or more of computing devices 112, 122, 132, 142, and 152 may comprise agency-issued devices. For example, each of the computing devices 112, 122, 132, 142, and 152 may comprise a body camera or vehicle-mounted camera device managed by an agency of respective responders 110, 120, 130, 140, and/or 150.

In another example, when communicating via the network 102, the computing devices 112, 122, 132, 142, 152, 162, and 172 are capable of sending communications directly to another of the computing devices 112, 122, 132, 142, 152, 162, and 172 (i.e., direct communication), to a subset of the computing devices 112, 122, 132, 142, 152, 162, and 172

(i.e., selective communication), or to all of the computing devices 112, 122, 132, 142, 152, 162, and 172 (i.e., broadcast communication). Communications between computing devices 112, 122, 132, 142, 152, 162, and 172 may be sent as push or pull notifications. In some embodiments, as discussed in greater detail below, communications are sent between one or more of the computing devices 112, 122, 132, 142, 152, 162, and 172 via a communication link based on determination made by a remote computing device (e.g., computing device 162 and/or computing device 172) or the respective mobile computing device computing devices 112, 122, 132, 142, and/or 152 itself.

In some embodiments, the responders 110, 120, 130, 140, 150, 160, and 170 are all associated with the same responder agency. Examples of responders from the same responder agency include police officers from the same police department, firefighters from the same fire department, private security personnel from the same organization, and the like. In other embodiments, at least some of the responders 110, 120, 130, 140, 150, 160, and 170 are associated with different responder agencies. Examples of responders from different responder agencies include police officers from one police department and police officers from another police department, state patrol officers and sheriffs deputies, federal agency agents and members of the armed forces, and the like. As described in greater detail below, when responders at least some of the responders 110, 120, 130, 140, 150, 160, and 170 are from different agencies, some embodiments of communication applications on the computing devices 112, 122, 132, 142, 152, 162, and 172 enable the responders 110, 120, 130, 140, 150, 160, and 170 from different agencies to establish a communication link to communicate with each other.

Figure 2:
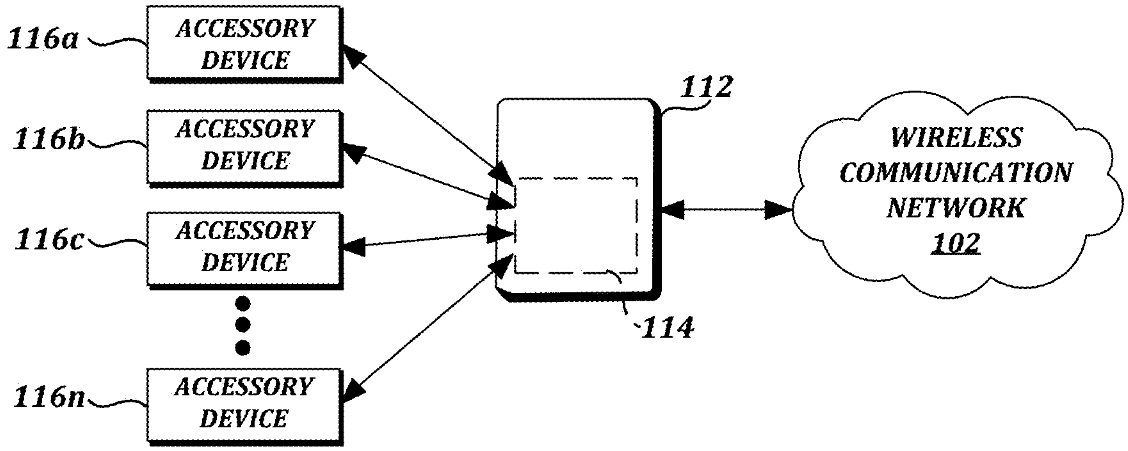
FIG. 2 is an embodiment of capabilities of a computing device of FIG. 1, in accordance with various embodiments.

An embodiment of the capabilities of the computing device 112 is depicted in FIG. 2. As described above, the computing device 112 includes the communications application 114 and is configured to communicate via the network 102. The computing device 112 is also capable of communicating with any number of accessory devices 116*a-n*. Examples of the accessory devices 116*a-n* include devices worn or carried by the responder 110, such as an on-body camera, a stun device, a firearm holster, an on-body microphone, a radio, and the like. Other examples of the accessory devices 116*a-n* include devices associated with a vehicle of the responder 110, such as a light bar, a dashboard camera, a microphone, an in-vehicle sensor, and the like. The accessory devices 116*a-n* can include any other device associated with the responder 110. In some embodiments, an accessory device may be integrated with computing device 112. For example, a computing device may comprise an on-body camera, wearable microphone, or vehicle-mounted camera in which a communication circuit is integrated that enables the camera or microphone itself to communicate with other computing devices via network 102. Such integrated computing devices may also comprise a respective communications application 114.

In some embodiments, the communications application 114 includes instructions that, when executed, cause the computing device 112 to send communications via the network 102 to computing devices of other responders and/or to a remote server associated with agency or responders. Communications may be transmitted periodically, e.g., every 1 minute, every 10 minutes, every 30 seconds, or may be transmitted responsive to a change in status of one or more of computing device 112 or associated accessory devices 116*a-n*, e.g., a change in location, new information being captured by one or more accessory devices, or the like. In some embodiments, the communications include information provided at least one of the accessory devices 116*a-n*. In some examples, the communication may comprise video from an on-body camera, audio from an on-body microphone, and the like. In some embodiments, the communication may comprise information indicative of a status change of the accessory devices 116*a-n*. In some examples, the communication may comprise an indication that a light bar of a vehicle has been activated, an indication that a holster has been unlocked to allow removal of a firearm, an indication that an on-body camera has initiated recording, and the like. In other embodiments, the communication may comprise information describing a current status of computing device 112. In other embodiments, the communication may comprise other information from the computing device 112. In some examples, the communication includes audio captured by a microphone of the computing device 112, text entered into the computing device 112, and the like.

In some examples, the communication includes information identifying a current location of computing device 112 (e.g., location data). For example, the information may comprise Global Positioning System (GPS) coordinates. Current location of computing device 112 may be used by one or more other computing devices, such as remote server or computing device, to determine whether computing device is within an area of interest, such as a geofenced area corresponding to an ongoing call for service or other incident. In some examples, computing device 112 is configured to transmit location data at a regular frequency.

In another embodiment, the communications application 114 includes instructions that, when executed, cause the computing device 112 to process information prior to sending it via the network 102. In one example, the communications application 114 causes the computing device 112 to reduce a resolution of the information (e.g., pictures, recorded video, video streams, etc.) prior to sending the information via the network 102. In another example, the communications application 114 causes the computing device 112 to tag the information with metadata (e.g., a time of capture of the information, a location of capture of the information, etc.) prior to sending the information via the network 102. In another example, the communications application 114 causes the computing device 112 to compile multiple forms of information (e.g., text and images) into a single transmission via the network 102.

In various embodiments, the communications application 114 includes instructions that, when executed, cause the computing device 112 to receive and store geofence information. The geofence information may be received over a communication link between computing device 112 and a remote computing device. In embodiments, the geofence information may be transmitted in a push notification from the remote computing device. Alternately, the geofence information may be transmitted in a pull notification from the remote computing device, responsive to a previously transmitted communication from computing device 112. Upon receiving the geofence information, communications application 114 may store the geofence information in a computer-readable storage medium of the computing device 112 for subsequent use.

In various embodiments, the communications application 114 includes instructions that, when executed, cause the computing device 112 to obtain location data. The location data may comprise location information identifying a current location of computing device 112. Obtaining the location data may comprise requesting location information from a position sensor integrated with computing device

112. For example, computing device 112 may comprise a GPS receiver circuit. Obtaining the location data may comprise requesting, by a processor of computing device 112, location information from the GPS receiver circuit. Responsive to the request, the GPS circuit may provide location information to the processor. The processor may store location data comprising the location information in a computer-readable storage medium of the computing device 112 for subsequent use. In other embodiments, the location information may be provided continuously and obtaining the location data may comprise storing the provided location information in location data at a point in time.

In some embodiments, obtaining location data may comprise transmitting the location data to a remote computing device. The location data may be transmitted at a certain frequency, enabling the remote computing device to track the current location of computing device 112 over time. The frequency may be regular. As further discussed herein, the frequency may be adjusted responsive to other information. Each transmitted location data may enable the remote computing device to update location information or data stored for computing device 112 in a computer-readable storage medium of the remote computing device for subsequent use.

In various embodiments, the communications application 114 includes instructions that, when executed, cause the computing device 112 to compare location data to geofence information. For example, geofence information may indicate, or be used to identify, a boundary around a location of a call for service or incident. Communications application 114 may obtain location data identifying a current position of computing device 112. This current position may be compared to the boundary to determine whether computing device 112 is within a geofence comprising the boundary. When computing device 112 is within the geofence, additional operations may be performed by computing device 112. For example, computing device 112 may initiate recording of record data associated with a call for service or incident. When computing device 112 is not within the geofence, the same additional operations may not be performed by computing device 112 in accordance with the location data and geofence information. In some embodiments, communications application 114 may cause computing device 112 to periodically compare the location data to stored geofence information to enable computing device 112 to determine whether a change to the current position of computing device 112 has occurred and, accordingly, perform the additional operations associated with the geofence.

In various embodiments, the communications application 114 includes instructions that, when executed, cause the computing device 112 to initiate recording of record data. The record data may comprise video data. Alternately or additionally, the record data may comprise audio data. Recording the record data may comprise storing the record data in a non-volatile, non-temporary memory of computing device 112. The stored data may be available for subsequent upload to a remote computing device for review.

The depiction in FIG. 2 includes an embodiment of the computing device 112. However, this embodiment is not limited only to computing device 112. Any of the other computing devices described herein, such as computing devices 122, 132, 142, 152, 162, and 172, may have similar capabilities to communicate via the network 102 and to communicate with responder devices associated with the computing devices.

Figure 3:
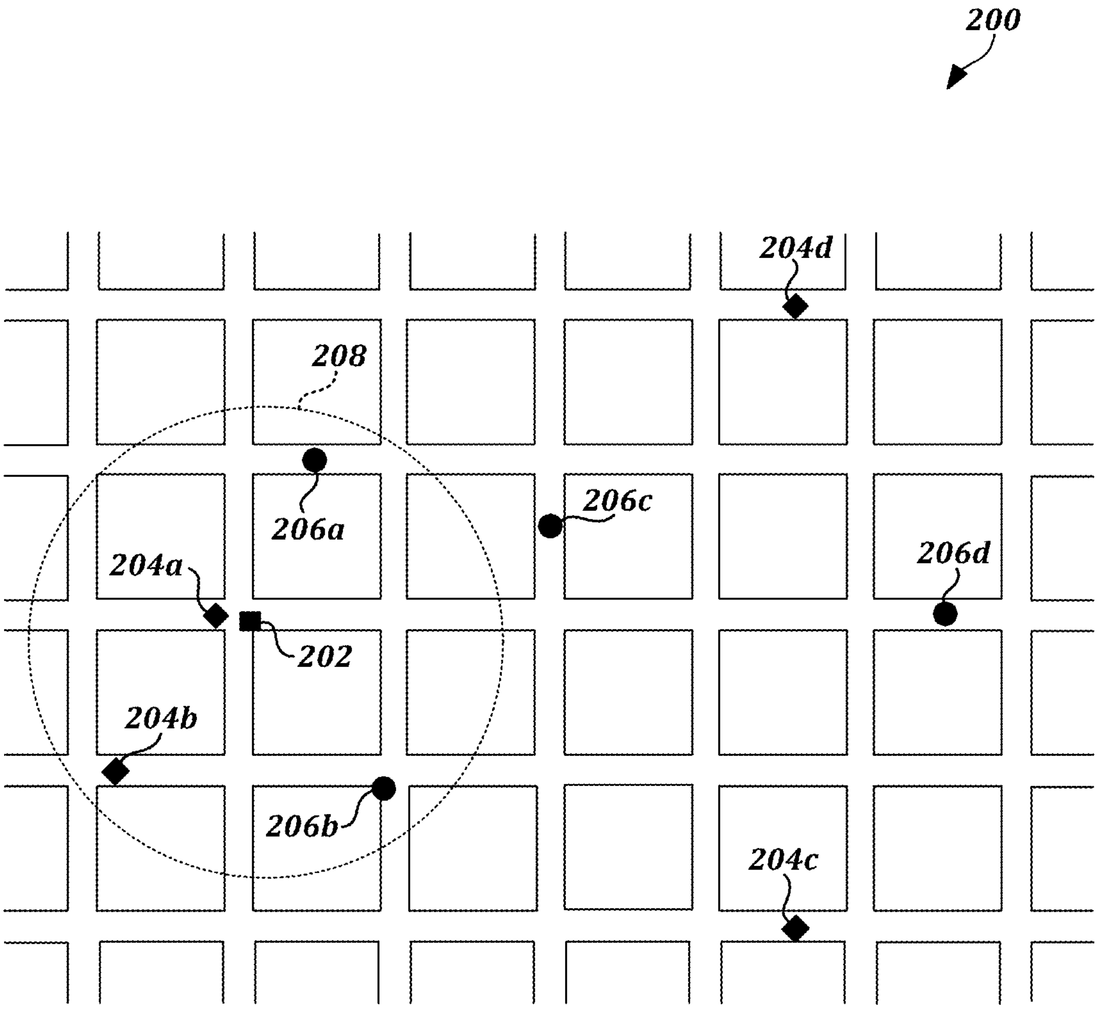
FIG. 3 is an embodiment for establishing a communication link between responders from different agencies at a particular location, in accordance with various embodiments.

An embodiment of establishing a communication link between responders from different agencies at a particular location is depicted in FIG. 3. Depicted in FIG. 3 is a representation of a map 200. The map 200 includes an indication of an incident 202. In one example, the incident 202 is one or more of a vehicle collision, a crime, an investigation, and the like. The map 200 also includes indications of responders having computing devices 204*a-d* and indications of responders having computing devices 206*a-d*. In one example, the responders having computing devices 204*a-d* are from a first responder agency (e.g., a police department), and the responders having computing devices 206*a-d* are from a second responder agency (e.g., a fire department).

Each of the responders has a computing device 204*a-d* (e.g., computing device 112) and the computing devices of the responders are configured to communicate with each other. Each of the responders has a computing device 206*a-d* (e.g., computing device 112) and the computing devices of the responders are configured to communicate with each other. In some embodiments, the computing devices 204*a-d* and the computing devices 206*a-d* are configured to send indications of their locations to one or more remote computing device, e.g., server and/or computing device associated with agency. In one example, the computing devices 204*a-d* send indications of their locations to a remote computing device of the first responder agency and the computing devices 206*a-d* send indications of their locations to a remote computing device of the second responder agency. In other embodiments, each of computing devices 204*a-d* and 206*a-d* may be configured to communicate with each other. For example, computing devices 204*a-d* and 206*a-d* may be in communication via a same logical and/or physical network (e.g., network 102). Alternately or additionally, each of computing devices 204*a-d* and 206*a-d* may be configured to communicate information with a same remote computing device (e.g., computing device 162 or 172). In accordance with each of the computing devices being in communication with each other, information may be commonly and selectively be communicated between the remote computing device and respective computing devices of computing devices 204*a-d* and 206*a-d*.

Each computing device 204*a-d*, 206*a-d* of the responders receives location information corresponding to the incident 202. In some embodiments, location information comprises geofence information from a server or remote entity associated with one or more responder agencies, e.g., the first responder agency and/or the second responder agency. The geofence information may enable each computing device of computing devices 204*a-d* and 206*a-d* to identify a geofence associated with an incident. For example, geofence information may comprise, for example, GPS coordinates corresponding to incident 202. Each computing device 204*a-d*, 206*a-d* of the responders may be configured to generate (e.g., detect, identify, calculate, etc.) the geofence as having a radius and corresponding to an area 208 of the incident. In another example, geofence information may comprise information identifying the geofence as having a radius and corresponding to an area 208 of the incident. Responders and respective computing devices inside the geofence may be determined to be at the location of the incident 202.

In some embodiments, radius corresponding to area 208 of the incident may be an activation radius, such that computing devices 204*a-d*, 206*a-d* of responders being inside the geofence (e.g., at the location of the incident 202) are configured to initiate one or more functions or to transmit instructions to one or more accessory devices (e.g., accessory devices 116*a-n*) to initiate one or more corresponding functions. For example, in some embodiments, computing devices 204*a-d*, 206*a-d* of responders may comprise a camera device, wherein the one or more functions comprise initiating recording data by the camera device responsive to being inside the area 208 of the incident. In other embodiments, computing devices 204*a-d*, 206*a-d* of responders are configured to increase a frequency of communications to one or more other devices. For example, computing devices 204*a-d*, 206*a-d* of responders may adjust their respective frequency of communications to a server or other remote entity associated with one or more responder agencies responsive to being inside the area 208 of the incident.

In other embodiments, radius corresponding to area 208 of the incident may be a safety radius, such that responders having computing devices 204*a-d*, 206*a* with locations inside the geofence are considered likely to respond to or interact with the incident 202. In some embodiments, computing devices 204*a-d*, 206*a-d* of responders being inside the geofence and/or being within a threshold distance from the geofence may receive the geofence information. In some embodiments, computing devices 204*a-d*, 206*a-d* of responders being inside the geofence and/or being within a threshold distance from the geofence may receive additional information describing incident 202, including one or more of: information describing an additional geofence (e.g., an activation radius as described previously), status of incident, priority level of incident, incident type, responders responding to incident, or the like.

In some embodiments, determinations are made as to which of the responders are at a location of the incident 202 based at least in part on area 208 captured by the geofence and location data captured by respective computing devices 204*a-d*, 206*a-d*. Thus, a determination is made that responders having computing devices 204*a-b* are at the location of the incident 202 (i.e., within the area 208) and a determination is made that the responders having computing devices 206*a-b* are at the location of the incident 202.

In embodiments, a determination regarding whether a computing device of responder is at a location of an incident 202 may be made by each respective computing device of a system. For example, a first determination may be made by a remote computing device relative to a plurality of computing devices of responders. Similarly, each remote computing device may make a determination for itself relative to the location of the incident 202 using location information it itself has obtained. As further discussed herein, multiple different geofences may be used by the different devices for such determinations. In an embodiment, in response to the determinations that responders are at the location of the incident 202, a communication link is established between the computing devices 204*a-b* and computing devices 206*a-b*. In one example, establishing the communication link includes permitting communication applications on the computing devices 204*a-b*, 204*a-b* of the responders to send and receive information to and from the other computing devices of the responders. Information may comprise, for example, live audio data, live video data, and the like.

In another embodiment, in response to the determinations that responders having computing devices 204*a-b*, 206*a-b* are at the location of the incident, a communication link is established between computing devices 204*a-b*, 206*a-b*, and a remote server or computing device, such as remote computing devices 162, 172 depicted in FIG. 1. Communication link between computing devices 204*a-b*, 206*a-b* and remote computing device may be used to send and receive information to and from responders and remote computing device, e.g., to provide data captured by computing devices of responders and/or accessory devices of responders, to provide updates on incident 202 by responders and/or by remote computing device, to provide updated location information of responders to remote computing device, or the like. In some embodiments, communication link is already established between server and one or more computing devices 204*a-b*, 206*a-b* and, in response to determinations that responders are at location of incident 202, a frequency of communications between responders and remote computing device is increased.

Figure 4:
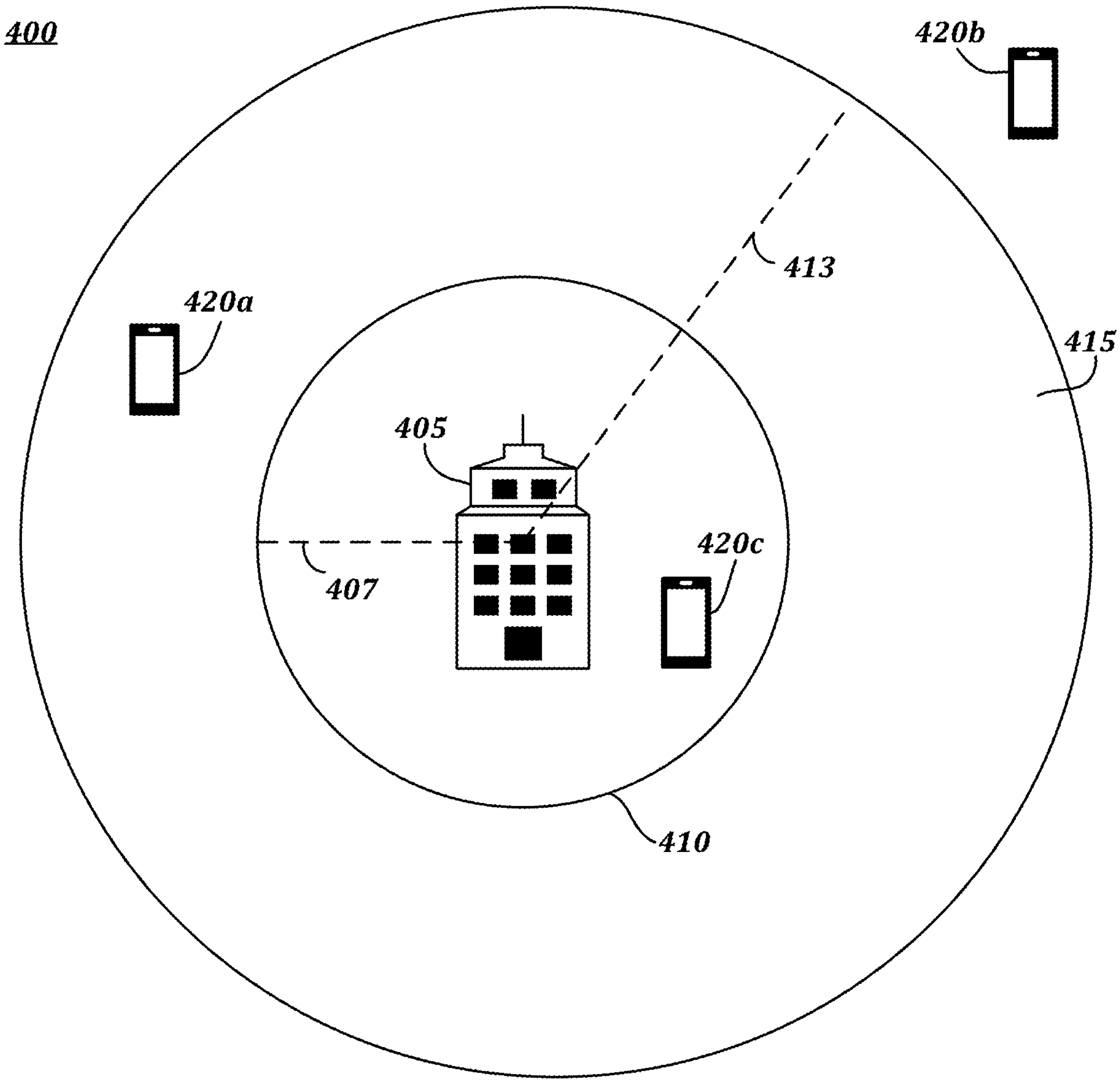
FIG. 4 is an example embodiment of multiple geofences generated responsive to a call for service, in accordance with various embodiments.

FIG. 4 is an example embodiment of an environment 400 associated with multiple geofences in accordance with various embodiments. The multiple geofences may be generated responsive to a call for service. A call for service may comprise information that enables one or more responders to respond to an incident. The call for service may further comprise communication of such information between two or more computing devices. For example, information regarding an incident may be transmitted from a remote computing device to a computing device of a responder. A call for service may be associated with a location of an incident. A call for service may comprise information that identifies the location of an incident. For example, a call for service in environment 400 identifies location 405 of an incident in environment 400.

In embodiments, information regarding location 405 may be provided to a remote computing device via voice communication. For example, a person at location 405 may identify location 405 to a dispatcher via a voice communication channel of a telephone call established between respective communication devices of the person and dispatcher. The dispatcher may then manually enter information identifying location 405 into the remote computing device via a user interface of the remote computing device.

Alternately or additionally, location 405 may be provided to a remote computing device via data communication. A communication device and/or network in communication with the remote computing device may automatically transmit information identifying location 405 to the remote computing device in response to a telephone call established between the communication device, network, and the remote computing device. For example, the information identifying location 405 may be provided responsive to a telephone call placed to an emergency telephone number by an Enhanced 911 (E911) system in communication with the remote computing device. The location 405 (e.g., information identifying location 405) may be used in subsequent operations performed by one or more of a remote computing device and/or a computing device of a responder of the responder system associated with the example embodiment of FIG. 4.

In some embodiments, the call for service may comprise additional information describing the incident and/or a response to the incident. The additional information may comprise call information. For example, the additional information may include a category type of the call for service, a priority level, a time of incident, a jurisdiction or responder type associated with incident, or the like. This information may be generated automatically at a remote computing device, received via a user interface of the remote computing device, or otherwise provided via the remote computing device. For example, additional information may be generated a remote computing device of a dispatcher, such as computing device 162 with brief reference to FIG. 1.

Environment 400 around location 405 may comprise one or more recording devices 420. For example, recording devices 420 of a system may comprise a first recording device 420*a*, a second recording device 420*b*, and a third recording device 420*c*. Each recording device of recording devices 420 may comprise a respective computing device 112 and/or accessory devices 116*a-n* with brief reference to FIG. 2). Recording devices 420 may be located at varying distances or positions relative to location 405 and may be associated with different responder types or agencies, as described in conjunction with FIG. 3. Recording devices 420 may be operated and relocated by a respective responder.

In embodiments, a responder system may determine one or more geofences for an environment. A geofence may comprise a boundary around a location. The location may comprise a location of an incident. The boundary may comprise a virtual boundary. The boundary may indicate physical positions around the location. In some embodiments, the boundary may comprise a radius about the location. In embodiments, a boundary may comprise one or more of an asymmetrical, non-radial, and/or other geometric shape around the location. Comparing a geofence to location information may comprise comparing the boundary to the location information. When the location information is between the boundary and the location and/or within an area encompassed by the boundary, a computing device at a location identified by the location information may be determined to be within the geofence. The computing device may be inside the geofence in accordance with the comparison. When the location information is not between the boundary and the location and/or not within an area encompassed by the boundary, a computing device at a location identified by the location information may be determined to not be within the geofence. The computing device may be outside the geofence in accordance with the comparison.

Responsive to receiving call for service, a server or other remote computing device of responder system (e.g., responder agency) may determine a geofence. The geofence may be determined relative to a location of an incident of the call for service. For example, the server may determine a first geofence 415. A boundary of first geofence 415 may comprise a safety radius 413. In some embodiments, safety radius 413 comprises a fixed radius. The fixed radius may be selected prior to generation of a call for service. The fixed radius may remain unchanged between a start time and an end time of the call for service. The fixed radius may be unchanged relative to additional information of the call for service. In accordance with the safety radius, a first geofence may encompass less than all of an area in which one or more responder computing devices of an agency may be disposed and/or in communication with the server or other remote computing device. In accordance with the safety radius, a first geofence of multiple geofences may comprise less than all of an area over which an agency has jurisdiction. For example, a safety radius may comprise 5 miles from location 405. Safety radius 413 may be selected by an operator of responder system. For example, safety radius 413 may be selected as a lower distance (e.g., <5 miles) in certain environments. For example, the lower distance may be selected in environments with high population density due to a likelihood of higher numbers of responders within a closer area relative to environments with lower population density. In other embodiments, safety radius 413 may be dynamically adjusted by server or other entity of responder system. Safety radius 413 may be adjusted after a call for service has been created and location 405 has been identified at the server or other remote computing device. For example, safety radius may be dynamically adjusted based at least in part on one or more of: a number of recording devices determined to be within a given radius; category of call for service; a time of incident; or other factors that may impact response time to call for service. In an example, safety radius 413 may be increased responsive to less than a threshold number of recording devices being detected within area 415 (e.g., less than 10 recording devices), such that a larger number of recording devices is captured by safety radius. In another example, safety radius 413 may be increased responsive to an incident occurring at night.

In some embodiments, each recording device of the one or more recording devices 420*a-c* is configured to periodically determine a current location of the recording device and to transmit the determined current location to server. The current location of each recording device may be transmitted to the server prior to a call for service (e.g., creation or generation of the call for service). Responsive to call for service, server identifies one or more recording devices 420*a*, 420*c* having locations within first geofence 415. Responsive to identifying the one or more recording devices 420*a*, 420*c* having locations within first geofence 415, the server transmits geofence information to the one or more recording devices 420*a*, 420*c*. The server may transmit the geofence information to the one or more recording devices 420*a*, 420*c* at a same time. In some embodiments, the server transmits geofence information to the one or more recording devices 420*a*, 420*c* via push notification. In an example embodiment, and responsive to call for service, the server identifies second recording device 420*b* having a location outside first geofence 415. Responsive to identifying the second recording device 420*b* having a location outside first geofence 415, the server may not transmit the geofence information to the recording device 420*b* in a push notification. Responsive to identifying the second recording device 420*b* having a location outside first geofence 415, the server may not transmit geofence information to the second recording device 420*b* at a same time at which the geofence information is transmitted to the one or more recording devices 420*a,c*. In some embodiments, including as further discussed below, the server may transmit the geofence information to the recording device 420*b* at a later time, subsequent and responsive to further communication between the service and the recording device 420*b*.

In some embodiments, a responder system determines multiple geofences. The multiple geofences may comprise a second geofence. The second geofence may be determined by a server or other computing device of the responder system. For example, a responder system associated with environment 400 may generate second geofence 410. A boundary of a second geofence 410 may comprise activation radius 407. Second geofence 410 may comprise a boundary defined by activation radius 407 about location 405 of the incident.

In embodiments, geofence information associated with second geofence 410 may be transmitted from the server or other remote computing device of responder system to one or more recording devices 420. In some embodiments, the geofence information may identify location 405 and the boundary of second geofence 410. The geofence information may indicate activation radius 407. In other embodiments, transmitted geofence information comprises information that enables a recording device to identify second geofence 410. For example, the geofence information may comprise location 405 of call for service and one or more recording devices 420*a*, 420*c* determine activation radius 407 and second geofence 410 based at least in part on location 405 of call for service. In such embodiments, activation radius 407 or other boundary may not be indicated in transmitted geofence information for the call for service. Rather, information regarding a distance and/or shape of a boundary for a geofence may be separately stored on the recording device. Responsive to receiving the location, the recording device may determine the geofence. In some embodiments, activation radius 407 comprises a fixed radius. For example, activation radius may comprise a distance of less than or equal to 500 meters from location 405. In some embodiments, activation radius 407 is less than safety radius 415, such that first geofence 415 encompasses a larger area than second geofence 410.

In some embodiments, activation radius 407 may be manually adjusted by an operator of responder system. For example, responders 160 or 170 may select a distance of activation radius 407 via respective user interfaces of remote computing devices 162 or 172.

In other embodiments, activation radius 407 may be dynamically adjusted. For example, in some embodiments, activation radius 407 may be dynamically adjusted based at least in part on information describing call for service. For example, responsive to call for service being associated with high priority level, activation radius 407 may be increased so as to encompass a greater area within second geofence 410. Alternately, responsive to call for service being associated with low priority level or lower priority level relative to the high priority level, activation radius 407 may be decreased so as to encompass a less area within second geofence 410. In another example, responsive to call for service being categorized as an incident having a high likelihood of spreading or moving to other areas, e.g., a fire, activation radius 407 may be increased so as to increase a likelihood of camera activation prior to encountering incident and all relevant data being recorded. In other embodiments, activation radius 407 may be dynamically adjusted over time. For example, activation radius 407 may be increased responsive to a lack of recording devices 420 being within second geofence 410 for more than a threshold amount of time. In another example, activation radius 407 may be increased responsive to a second call for service originating from a same location 405, e.g., due to a second deployment of firearm associated with a same incident.

In some embodiments, transmitted geofence information additionally comprises an expiration time. The expiration time may be used by a recording device to perform one or more operations. The one or more operations may be performed when the expiration time has passed (e.g., when a current time has exceeded the expiration time). For example, and responsive to an expiration time, recording devices 420 having initiated recording of record data responsive to being inside the second geofence 410 may be configured to stop recording. In some embodiments, server is additionally configured to close one or more communications channels responsive to the expiration time. For example, server may communicate to recording devices 420 via communications channels regarding call for service, e.g., to receive record data from one or more recording devices inside second geofence 410. Responsive to expiration time, server may automatically close communications channels to recording devices 420.

In some embodiments, one or more other functions of recording devices 420*a*, 420*c* may be initiated or modified responsive to receiving geofence information. For example, recording devices 420*a*, 420*c* may increase a frequency of transmitting location data to server, e.g., at intervals of 30 seconds from a previous interval of 1 minute. The frequency of transmitting location data may be increased responsive to receiving the geofence information and independent of a current location of the recording device. The frequency of transmitting location data may be increased for first recording device 420*a*, despite a current location of first recording device being outside second geofence 410. Both recording devices 420*a*, 420*c* may increase a frequency responsive to receiving geofence information. The detection of the current location at the respective recording device (e.g., 420*a* or 420*c*) may enable the device to more frequently compare the current location to the geofence information. In some embodiments, the frequency of detection and transmission of the current location may be increased. In other embodiments, the frequency of detection may be increased independent of whether the current location is subsequently transmitted to a server or other remote computing device of a responder system.

In another example, responsive to being inside the second geofence 410 associated with activation radius 407, a recording device may initiate recording data. For example, responsive to receiving geofence information of second geofence 410, third recording device 420*c* may begin storing video, audio, image, or other live data in a non-volatile computer-readable storage medium of third recording device 420*c*. The live data may be different (e.g., separate) from buffered data that may have been temporarily retained prior to the recording being initiated. In some embodiments, initiating recording may comprise discontinuing buffering of data (e.g., pre-event data) and beginning storing of record data for an incident (e.g., event data) in a memory of a recording device. In some embodiments, third recording device 420*c* may alternately or additionally transmit recording data in real-time to server. In contrast, first recording device 420*a* may receive the geofence information, but may not perform a subsequent operation responsive to receiving the geofence information because first recording device 420*a* is located outside the second geofence 410. By receiving the geofence information, first recording device 420*a* may be prepared to perform such functions if first recording device 420*a* subsequently enters the second geofence 410. However, and despite receiving the geofence information, first recording device 420*a* may not initiate recording data unless or until it is further disposed with the second geofence 410 associated with the geofence information. Unless the geofence information is received by a recording device, the one or more functions may not be performed. For example, and at a first point in time, second recording device 420*b* may not receive geofence information associated with second geofence 410, while the geofence information may be received by first recording device 420*a* and third recording device 420*c*. Accordingly, second recording device 420*b* may not perform various operations, including changing a frequency of location data transmission and/or initiating recording data. Accordingly, power of a battery of second recording device 420*b* that might otherwise be expended to perform such operations may be preserved. A response system according to various aspects may preserve battery live and avoid unnecessary data recordings or alerts, and yet still provide pertinent information to recording devices in communication with a same remote computing device over a same network.

In some embodiments, responsive to recording devices 420 leaving safety radius and/or activation radius, the one or more functions may revert to normal operation. For example, server and/or recording devices 420 may be configured to, responsive to recording devices leaving safety radius and/or activation radius, end communications channel between server and recording device. In another example, recording device 420 may be configured to reduce frequency of transmitting location data to server. For example, the frequency of transmitting may be reduced from 30 seconds to normal operation interval of 1 minute.

In some embodiments, different devices of a system may use different geofences to perform subsequent operations. A remote computing device may apply a first geofence to perform one or more subsequent first operations, while a computing device of a responder may apply a second geofence to perform one or more subsequent operations. For example, a remote computing device may compare a geofence information associated with first geofence 415 to location information for a plurality of devices to determine which devices subsequently receive geofence information associated with second geofence 410. Responsive to receiving the geofence information associated with second geofence 410, recording devices 420*a*, 420*c* may use the information associated with second geofence 410 to determine whether to initiate recording of record data or perform other subsequent operation. In some embodiments, different devices of a system may not receive information regarding other geofences for which they do not perform subsequent operations. For example, geofence information associated with first geofence 415 may not be transmitted to recording devices 420 and/or otherwise not used by recording devices 420 for subsequent operations. Rather, first geofence 415 may be employed by a remote computing device to determine whether geofence information should be transmitted to each recording device of a plurality of recording devices.

In some embodiments, one or more recording devices of recording devices 420 located outside of first geofence 415 corresponding to safety radius 413 may receive transmitted geofence information separately from at least one other recording device of recording devices 420. The transmitted geofence information may be received separately despite a same server or remote computing device of a responder system being communicatively coupled to each of the one or more recording devices and the at least one recording device of recording devices 420. A recording device of the one or more recording device may comprise an uninformed recording device to which geofence information is not transmitted on a same basis as the at least one other recording device of recording devices 420.

In some embodiments, the one or more recording devices may separately receive the transmitted geofence information at a later time. The one or more recording devices may receive the geofence information responsive to a message (e.g., poll request, location update, etc.) initiated by the one or more recording devices. Responsive to the message, a server or other remote computing device of a responder system may transmit the geofence information as a pull notification to the one or more recording devices. In contrast, the at least one recording device may receive the geofence information as a push notification. The push notification may be initiated by the server or other remote computing device. For example, recording device 420*b* periodically initiates a communication link to server. Responsive to receiving the communication, the server transmits geofence information to second recording device 420*b*.

In some embodiments, the communication link may enable second recording device 420*b* to transmit a current location of second recording device 420*b* outside of safety radius 413. The current location may be included in the message transmitted from second recording device 420*b* over the communication link. Responsive to the communication and/or communication link, the geofence information may be included in an acknowledgement sent from the server or other computing device responsive to the received current location. The geofence information may be transmitted to the recording device independent of whether transmission of the current location includes a specific request for geofence data. Rather, the server may be configured to transmit the geofence information in response to the communication link initiated by the recording device. The geofence information may be responsively transmitted independent of a type, basis, or content of an information initially transmitted from the recording device to the server.

In other embodiments, the communication link may specifically include a request for geofence information. The current location of the recording device may be included with the request. Responsive to the request, a remote computing device may transmit a pull notification to the recording device, wherein the pull notification comprises the geofence information.

In embodiments, safety radius 413 and/or activation radius 407 may be dynamically adjusted to include one or more additional recording devices 420*b* at a later time (e.g., second time after first time at which geofence information for a same incident was previously transmitted). For example, safety radius 413 and/or activation radius 407 may be adjusted responsive to less than a threshold number of recording devices being inside one or more of the safety radius or activation radius. Upon adjustment, a geofence associated with safety radius 413 and/or activation radius 407 may include an additional recording device to which geofence information for a same incident and/or same location of incident was previously transmitted. Responsive to safety radius 413 and/or activation radius 407 being adjusted, server may be configured to transmit updated geofence information to one or more recording devices 420*a-c*. For example, an adjusted safety radius 415 that includes second recording device 420*b* may cause geofence information to be further transmitted to second device 420*b*. Alternately, an adjusted safety radius 415 that includes second recording device 420*b* may cause geofence information to be transmitted to each of recording devices 420*a-c*.

Figure 5:
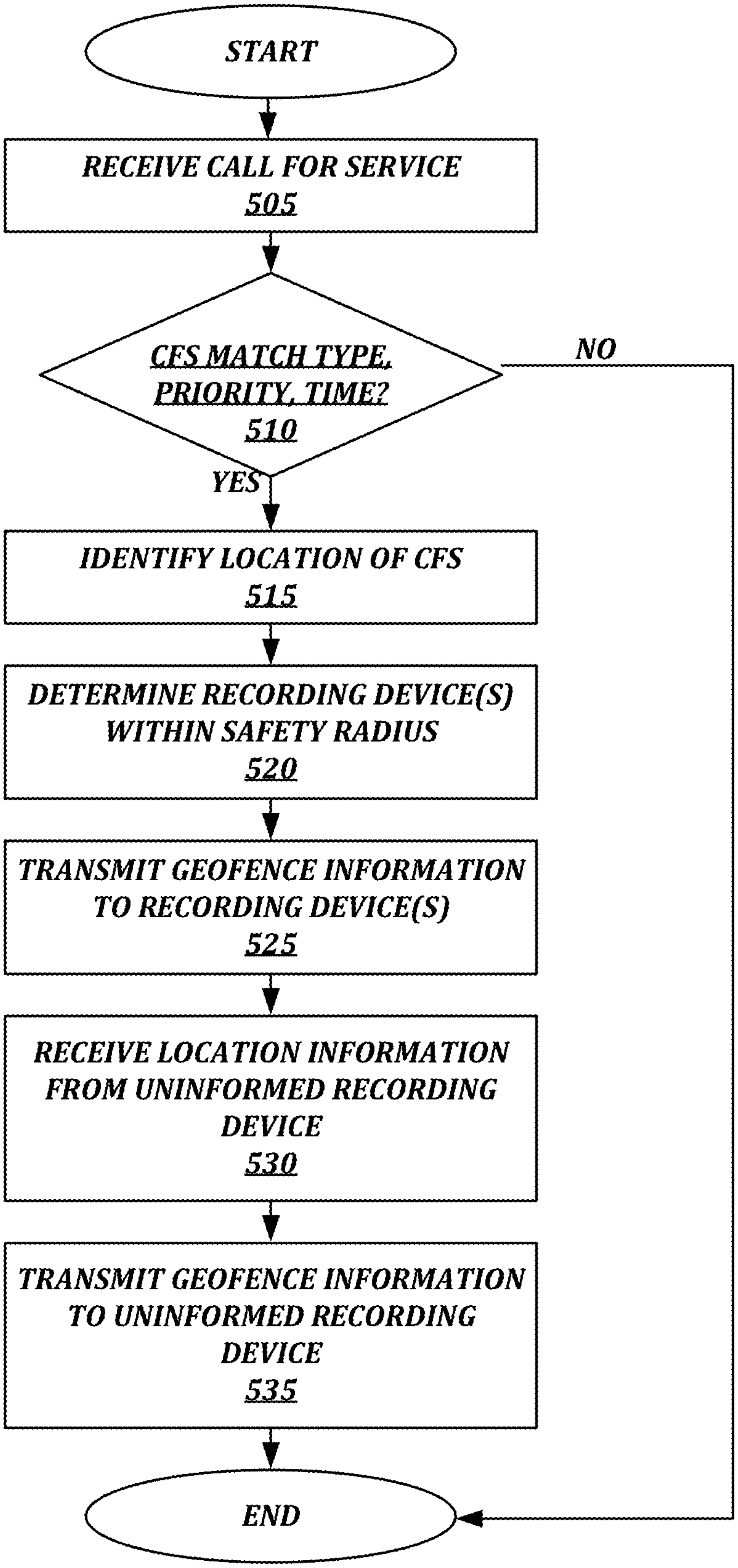
FIG. 5 is a flowchart depicting an example method for generating and using multiple geofences to activate one or more recording devices, in accordance with various embodiments.

FIG. 5 is a flowchart depicting an example method for initiating recording by one or more recording devices using multiple geofences, in accordance with various embodiments. One or more operations of the example method may be performed by one or more computing devices of a system. In embodiments, the system comprises a remote computing device and a plurality of recording devices. The remote computing device may comprise a server. The remote computing device may comprise a storage medium in which information may be stored for subsequent processing. In some embodiments, each recording device may be similar to or share functions or characteristics of computing device 112 of FIGS. 1, 2. Each recording device of the plurality of recording devices is configured to transmit location data to the server. The location data may be, for example, GPS data. The location data may be transmitted at regular intervals. For example, location data indicating a current location may be transmitted at 1 minute, 10 minute, or other time intervals. Alternately or additionally, location data indicating a current location may be transmitted responsive to the recording device traveling more than a threshold distance from a last location.

In embodiments, a method of using multiple geofences according to various aspects of the present disclosure may comprise one or more operations of receiving a call for service 505, determining whether a call for service matches predetermined information 510, identifying a location of a call for service 515, determining one or more recording devices within a safety radius 520, transmitting geofence information to one or more recording devices 525, receiving location information from at least one uninformed recording device 530, and/or transmitting geofence information to an uninformed recording device 535. The one or more operations may be performed by a remote computing device in communication with a plurality of recording devices comprise the one or more recording devices and the at least one uninformed recording device. For example, the remote computing device may comprise a server or computing device 162 in communication over network 102 with one or more responder computing devices 112, 122, 132, 142, and/or 152 with brief reference to FIG. 1. In embodiments, the one or more responder computing devices 112, 122, 132, 142, and/or 152 may each comprise a respective recording device of a plurality of recording devices 420 with brief reference to FIG. 4.

In embodiments, the server is configured to receive 505 a call for service. The call for service may be received in response to an emergency call or other communication being received by a remote computing device of a responder system. In some embodiments, the call for service may be received by the server from a computing device or system such as a mobile phone, laptop computer, another server, a cloud-based computing device, or other device. In some embodiments, the call for service may be received from a dispatch computing device. The computing device may communicate the call for service to the server via wired or wireless communication methods. In some embodiments, the call for service comprises information describing an incident. For example, the server may receive information describing a location of incident. In other examples, the server may additionally receive information comprising one or more of: a call for service category type; a time of incident; a priority level of incident; or other relevant information for responders to the incident. A call for service category type may identify a type of incident, e.g., a car collision or fire, or may identify a type of responder or a responder agency associated with the incident, e.g., firefighters or policemen. A priority level may represent an urgency associated with the incident, e.g., such that emergency incidents are ranked or scored more highly than non-emergency incidents.

In embodiments, the server determines 510 whether information associated with a received call for service matches one or more criteria for initiating recording devices. In some embodiments, for example, server is configured to respond to calls for service having a threshold priority ranking or score, e.g., calls for service associated with urgent or emergency incidents. In other embodiments, server is configured to respond to calls for service having one or more specified categories, e.g., a physical conflict or deployment of firearm where record data may be more valuable. In other embodiments, server is configured to respond to calls having an incident time within a threshold time limit, e.g., only incidents having occurred within a previous one-hour time period; only incidents having occurred between midnight and noon; or the like. In other embodiments, other criteria or combinations of criteria may be used by server to determine whether to proceed with generating geofences and initiating recording devices. When the information matches the one or more criteria, additional operations may be performed. When the information does not match the one or more criteria, the method may end. In accordance with the one or more criteria, selective initiation of recording by a recording device may avoid capture of record data for incidents that do not have associated and/or required video or audio information.

In embodiments, and responsive to a call for service matching one or more criteria, server identifies 515 a location of the call for service. The location of the call for service may comprise a location of an incident. Information identifying the location may be included with the call for service. Identifying the location of the incident may comprise receiving the information indicating the location. In some embodiments, the location may be manually entered at a remote computing device. For example, a dispatcher may input the location to a dispatch computing device, which is then transmitted to the server. In other embodiments, the location may be automatically received from another computing device of a responder system. For example, responsive to a call for service, a call location system (e.g., E911) may automatically provide a location of a call for service that comprises a location from which an emergency communication was transmitted.

In embodiments, identifying 515 a location of a call for service may comprise determining a first geofence. The first geofence may comprise a boundary around the location of the call for service. In some embodiments, the boundary may comprise a safety radius. The server may generate the first geofence in accordance with the location of the call for service. For example, the first geofence may be generated by the server by determining a boundary that is a fixed radius about the location of the call for service. Alternately, the server may determine the boundary in accordance with the location and additional information of the call for service. For example, a distance of a boundary around a location may be selected in accordance with the type of call for service. In embodiments, identifying 515 the location of the call for service may comprise determining information that indicates the location and information that indicates a boundary of the first geofence. The first geofence may be generated prior to transmission of information regarding the call for service to one or more recording devices of a plurality of recording devices 420 with brief reference to FIG. 4.

In embodiments, the server determines 520 a set of recording devices within a safety radius or region. The set of recording devices may comprise one or more of a plurality of recording devices. The set of recording devices may comprise a subset of the plurality of recording devices. The set of recording devices may comprise less than all recording devices in communication with the server. The safety radius may be determined relative to the location of the call for service. The safety radius may be centered at the location. In some embodiments, as discussed previously, safety radius comprises a fixed radius, e.g., 2 miles, 5 miles. The fixed radius may be modified by an operator of server. In other embodiments, the safety radius comprises a radius that may be dynamically adjusted based at least in part on one or more of: a number of recording devices determined to be within a safety and/or activation radius; a type of call for service; a time of incident; or other factors that may impact response time to call for service.

In embodiments, determining 520 the set of recording devices may comprise receiving a location for each recording device of the plurality of recording devices. Receiving the location may comprise receiving information indicating the location (e.g., location information) for each recording device of the plurality of recording devices. The location information may be periodically received by the server from each respective recording device. In some embodiments, the location information may be stored in a data store accessible to the server. The location information may be stored in the data store prior to receiving 505 the call for service. In embodiments, receiving the location information may comprise accessing the location information from the data store.

In embodiments, determining 520 the set of recording devices within a safety radius may comprise comparing a first geofence to a location of each computing device of a responder of a plurality of such computing devices. A boundary of the first geofence may comprise the safety radius. The comparing (e.g., performing a comparison) may indicate that one or more computing devices of the plurality of computing devices are within the safety radius. For example, comparing first geofence 415 to location information of recording devices 420 may identify first recording device 420*a* and third recording device 420*c* to be within safety radius 413. The comparing (e.g., performing a comparison) may indicate that at least one computing device of the plurality of computing devices is not within the safety radius. For example, comparing first geofence 415 to location information of recording devices 420 may identify second recording device 420*b* to not be within safety radius 413. Responsive to the one or more recording devices being determined to be within the first geofence, the one or more operations may be automatically performed for the one or more recording devices. In contrast, the same one or more operations may not be performed for the at least one recording device determined to be outside the first geofence. Accordingly, the set of recording devices may comprise less than all computing devices of responders for which location information is received by the server.

In embodiments, server transmits 525 geofence information to the determined set of recording devices. The geofence information may be automatically transmitted in response to determining the set of recording devices. In some embodiments, server transmits a push notification comprising the geofence information to the determined set of recording devices. In some embodiments, server additionally establishes a communications channel between server and each recording device of the determined set of recording devices. Communications channel may be used to transmit and/or receive status updates, location updates, record data, and the like.

In embodiments, the geofence information is associated with a second geofence. The second geofence may be used by a computing device to initiate recording of data. The second geofence may be different from a first geofence employed in determining 520 the set of recording devices.

In embodiments, the geofence information may be transmitted independent of whether the determined set of recording devices are within the second geofence. The determined set of recording devices may be within and/or not within the second geofence as indicated by location information for each of the respective recording devices of the set of recording devices. For example, transmitting 525 the geofence information may comprise transmitting the geofence information to both a first recording device 420*a* and third recording device 420*c*.

In embodiments, transmitting 525 the geofence information may comprise not transmitting the geofence information to a recording device of a plurality of recording devices in an environment. For example, second recording device 420*b* may be excluded from receiving the geofence information upon transmitting 525. The recording device may be excluded in accordance with a first geofence determined by a server or other remote computing device, the first geofence different from a second geofence with which the transmitted geofence information is associated.

In some embodiments, the geofence information comprises location of the call for service. Responsive to receiving the location, each recording device of the set of recording devices is configured to determine an activation radius. The activation radius may be centered at location of the call for service. Responsive to receiving the geofence information, each recording device may use the location to identify a set of geographic coordinates with which a current location of each recording device may be subsequently compared.

In other embodiments, geofence information comprises a second geofence. The geofence information may comprise information indicating a boundary of the second geofence. In some embodiments, the geofence information may further include the location of the call for service. The boundary may correspond to an activation radius. The activation radius may be centered at location of call for service. The activation radius may be centered at a same location as an activation radius. The geofence information may comprise a set of geographic coordinates with which a current location of each recording device may be compared. In some embodiments, the activation radius is smaller than or less than a safety radius. For example, the activation radius in some embodiments may be less than or equal to 500 meters, such that an area represented by activation radius is smaller than an area represented by safety radius. The second geofence may be concentric with the first geofence. In some embodiments as discussed previously, activation radius may be dynamically adjusted over time and/or based on one or more criteria associated with call for service information.

In some embodiments, geofence information additionally comprises an expiration time. The expiration time is a time at which recording devices within activation radius are configured to stop recording, e.g., after an amount of time has passed such that call for service is expected to be resolved. In some examples, server and/or recording devices may additionally be configured to end one or more communications channels between server and recording devices responsive to expiration time.

In embodiments, and responsive to receiving the transmitted geofence information, each recording device of the set of recording devices may determine whether to initiate recording. Recording of record data may be initiated responsive by a recording device in accordance with the geofence information. Recording of record data may be initiated responsive to the recording device having a current location within an activation radius. Determining whether to initiate recording may comprise comparing a current position of the recording device with an activation radius associated with the geofence information. The comparing may indicate the recording device is within the activation radius. For example, comparing activation radius 407 of second geofence 410 to location information of third recording device 420*c* may determine third recording device 420*c* to be within activation radius 407. Responsive to the comparison, third recording device 420*c* may initiate recording of recorded data comprising video and/or audio data. The comparing may indicate that the recording device is not within the activation radius. Comparing activation radius 407 of second geofence 410 to location information of first recording device 420*a* may determine first recording device 420*a* to not be within activation radius 407. Responsive to the comparison, first recording device 420*a* may refrain from initiate recording of first recorded data comprising first video and/or first audio data. Second recording device 420*b* may not perform such a comparison in accordance with not the geofence information not being transmitted to second recording device 420*b* upon transmitting 520.

In embodiments, a current location of a respective recording device may be different than a current location previously transmitted to a server. For example, the recording device may move from a first current location at a first time to a second location at a second time, wherein the first location is transmitted to a remote computing device and the second location is used for the comparison responsive to receiving the transmitted geofence information. By enabling different current locations to be compared, a recording device may accurately self-determine whether recording of respective recorded data should be initiated.

In some embodiments, and responsive to receiving the transmitted geofence information, each recording device may increase a frequency at which a current location is detected. For example, first recording device 420*a* may increase a frequency at which it detects its location to an interval less than an interval prior to receiving the geofence information. The interval may be less than an interval at which other recording devices, such as second recording device 420*b*, provide their respective location information. Such an arrangement may decrease a period of time between the recording device entering a second geofence or activation radius and detecting that recording device has entered the second geofence or activation radius.

In embodiments, at a later time from the geofence information being transmitted to the set of recording devices determined to be inside the safety radius, the geofence information may be transmitted to one or more other recording devices of a plurality of recording devices. The one or more other recording devices may comprise an uninformed device. An uninformed device may comprise a recording device in communication with the server to which the geofence information was not transmitted upon transmitting 525. The uninformed recording device may comprise a recording device separate from determined set of recording devices and/or having a location outside of determined safety radius. The geofence information may be transmitted to the uninformed device at a second time after a first time at which the geofence information was transmitted to the determined set of recording devices.

In some embodiments, and at a later time, server receives a communication from an uninformed recording device. The communication may comprise a message and/or request from the uninformed recording device. The communication may comprise a poll request from the uninformed recording device. For example, the uninformed recording device may periodically request geofence information currently active for a responder system. Receiving the communication may comprise establishing a new communication link between the server and the recording device. The communication may be transmitted over a new communication link relative to another communication link over which a previous communication may be received. In some embodiments, the communication may be transmitted to the server independent of each of the call for service, the first geofence, and/or the second geofence. The uninformed recording device may not have received the geofence information upon transmitting the communication to other recording device of the responder system.

In some embodiments, receiving the communication may comprise receiving 530 location information from the uninformed recording device. The communication may comprise the location information from the uninformed recording device. For example, as discussed elsewhere herein recording devices 420 of a responder system may periodically provide location information regarding a current location of the respective recording device of recording devices 420. This location information may be stored by the server. For example, this location information may be used for determining 520 recording device(s) within a safety radius after a call for service is received. Receiving 530 the location information may comprise receiving new location information relative to previous location information received from the uninformed recording device. In some embodiments, the previous location information may have been employed in determining 520 recording device(s) within a safety radius. For example, the communication may be received from second recording device 420*b* with brief reference to FIG. 4.

In embodiments, server transmits 530 geofence information to an uninformed recording device. The geofence information may be transmitted responsive to receiving the communication from the uninformed recording device. In some embodiments, server transmits a pull notification comprising the geofence information to the uninformed recording device. Such an arrangement may enable a computing device of a responder to begin recording data when the computing device has moved towards the location of incident. Transmitting the geofence information may alternately or additionally enable information regarding the call for service to be displayed or otherwise be output by the computing device, thereby enabling the responder to respond to incident if necessary, e.g., if additional responders are required or requested.

In embodiments, transmitting 535 the geofence information to the uninformed recording device may comprise transmitting 535 the geofence information to the uninformed recording device independent of content of the communication. The geofence information may be transmitted independent of a location information in the communication. For example, the geofence information may be transmitted to second recording device 420*b* independent of whether location information received from second recording device 420*b* indicates second recording device 420*b* is within or not within either safety radius 413 or activation radius 407. Accordingly, the uninformed recording device may receive geofence information, though a resource of the uninformed recording device (e.g., battery, processing cycles, etc.) may be preserved by including this geofence information with an existing communication session between the uninformed recording device and the server, rather than establishing a new communication session and/or link over which the geofence information may be provided when the recording device is determined to be closer to a location of a call for service.

In some embodiments, the server is further configured to receive record data from one or more recording devices inside activation radius. The recorded data may be received responsive to transmitting geofence information 525 and/or transmitting geofence information 535. In some embodiments, server may store record data in association with call for service, perform one or more processing steps to record data, and/or display record data to a user in real-time.

In the example flowchart of FIG. 5, steps are performed by a server or other computing device, such as a computing device associated with a responder agency. The computing device may be similar to, or share characteristics or functions with, remote computing devices 162, 172 of FIG. 1. In other embodiments, the steps may be performed by other entities or systems, and the method may comprise additional, fewer, or different steps, and the steps may be performed in a different order than described herein.

Figure 6:
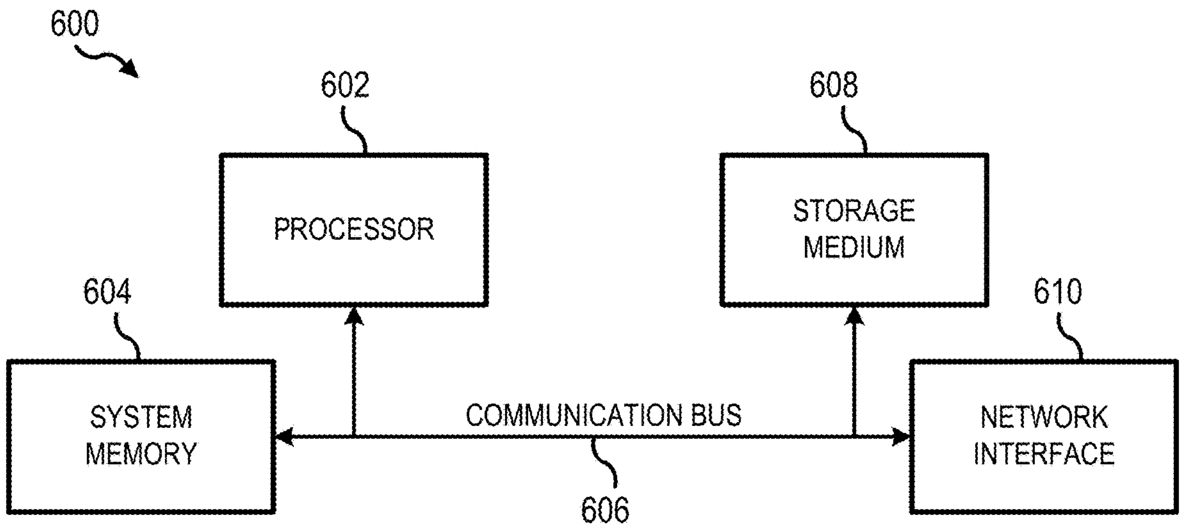
FIG. 6 is a block diagram illustrating components of a computer-based system, in accordance with various embodiments.

In various embodiments, and with reference to FIG. 6, an exemplary computer-based system 600 is disclosed. Computer-based system 600 may be appropriate for use in accordance with embodiments of the present disclosure. The accompanying description of computer-based system 600 may be applicable to servers, personal computers, mobile phones, smart phones, tablet computers, embedded computing devices, and other currently available or yet-to-be-developed devices that may be used in accordance with embodiments of the present disclosure. Computer-based system 600 may implement a computing device as discussed herein, including a server, a remote computing device, a recording device, and/or each of computing devices 112, 122, 132, 142, 152, 162, and/or 172, as well as recording devices 420 with brief reference to FIGS. 1 and 4.

Computer-based system 600 may include a processor 602 and a system memory 604 connected by a communication bus 606. Depending on the exact configuration and type of computer-based system, system memory 604 may be volatile or nonvolatile memory, such as read only memory ("ROM"), random access memory ("RAM"), EEPROM, flash memory, or other memory technology. Those of ordinary skill in the art and others will recognize that system memory 604 typically stores data and/or program modules that are immediately accessible to and/or currently being operated on by processor 602. In this regard, processor 602 may serve as a computational center of computer-based system 600 by supporting the execution of instructions. Processor 602 may comprise one or more processing units, as discussed further herein. System memory 604 may comprise one or more memory units, as discussed further herein. In embodiments, processor 602 may be configured to perform one or more operations of FIG. 5 and/or other operations of a computing device disclosed herein.

Computer-based system 600 may include a network interface 610 comprising one or more components for communicating with other devices and systems over a network. Embodiments of the present disclosure may access basic services that utilize network interface 610 to perform communications using common network protocols. Network interface 610 may comprise a communications unit, as discussed further herein.

Computer-based system 600 may also include a storage medium 608. However, services may be accessed using a computer-based system that does not include means for persisting data to a local storage medium. Therefore, storage medium 608 depicted in FIG. 6 is optional. Storage medium 608 may be volatile or nonvolatile, removable or nonremovable, implemented using any technology capable of storing information such as, but not limited to, a hard drive, solid state drive, CD-ROM, DVD, or other disk storage, magnetic tape, magnetic disk storage, and/or the like. Storage medium 608 may include one or more memory units, as discussed further herein.

As used herein, the term "computer-readable medium" includes volatile and nonvolatile and removable and nonremovable media implemented in any method or technology capable of storing information, such as computer-readable instructions, data structures, program modules, or other data. In this regard, system memory 604 and storage medium 608 depicted in FIG. 6 are examples of computer-readable media.

For ease of illustration and because it is not important for an understanding of the claimed subject matter, FIG. 6 does not show some of the typical components of many computer-based systems. In this regard, computer-based system 600 may include input devices, such as a keyboard, keypad, mouse, trackball, microphone, video camera, touchpad, touchscreen, electronic pen, stylus, and/or any other input device described herein. Such input devices may be coupled to computer-based system 600 by wired or wireless connections including RF, infrared, serial, parallel, BLUETOOTH®, USB, or other suitable connection protocols using wireless or physical connections.

In any of the described examples, data can be captured by input devices and transmitted or stored for future processing. The processing may include encoding data streams, which can be subsequently decoded for presentation by output devices. Media data can be captured by multimedia input devices and stored by saving media data streams as files on a computer-readable storage medium (e.g., in memory or persistent storage on a client device, server, administrator device, or some other device). Input devices can be separate from and communicatively coupled to computer-based system 601 (e.g., a client device), or can be integral components of computer-based system 600. In some embodiments, multiple input devices may be combined into a single, multifunction input device (e.g., a video camera with an integrated microphone).

Computer-based system 600 may also include output devices such as a display, speakers, printer, and/or any other output device described herein. The output devices may include video output devices such as a display or touchscreen. The output devices also may include audio output devices such as external speakers or earphones. The output devices can be separate from and communicatively coupled to computer-based system 600, or can be integral components of computer-based system 601. Input functionality and output functionality may be integrated into the same input/output device (e.g., a touchscreen). Any suitable input device, output device, or combined input/output device either currently known or developed in the future may be used with described systems.

In various embodiments, a "processing unit" as described herein may comprise any suitable hardware and/or software-based processing component. For example, a processing unit may comprise one or more of a processing circuit, a processor, an application specific integrated circuit (ASIC), a controller, a microcontroller, a microprocessor, a programmable logic device, logic circuitry, and/or the like.

In various embodiments, a "communications unit" as described herein may comprise any suitable hardware and/or software components capable of enabling the transmission and/or reception of data. A communications unit may enable electronic communications between devices and systems. A communications unit may enable communications over a network. Examples of a communications unit may include a modem, a network interface (such as an Ethernet card), a communications port, etc. Data may be transferred via a communications unit in the form of signals which may be electronic, electromagnetic, optical, or other signals capable of being transmitted or received by a communications unit. A communications unit may be configured to communicate via any wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZigBee® protocol maintained by the ZigBee alliance), a cellular protocol, an infrared protocol, an optical protocol, or any other protocol capable of transmitting information via a wired or wireless connection.

Two or more of the system components may be in electronic communication via a network. As used herein, the term "network" may further include any cloud, cloud computing system, or electronic communications system or method that incorporates hardware and/or software components. Communication amongst the devices and systems over a network may be accomplished through any suitable communication channel, such as, for example, a telephone network, an extranet, an intranet, the internet, a wireless communication, local area network (LAN), wide area network (WAN), virtual private network (VPN), and/or the like.

Electronic communications between the systems and devices may be unsecure. A network may be unsecure. Electronic communications disclosed herein may utilize data encryption. Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

In various embodiments, a "memory" or "memory unit" as discussed herein may comprise any hardware, software, and/or database component capable of storing and maintaining data. For example, a memory unit may comprise a database, data structure, memory component, or the like. A memory unit may comprise any suitable non-transitory memory known in the art, such as, an internal memory (e.g., random access memory (RAM), read-only memory (ROM), solid state drive (SSD), etc.), removable memory (e.g., an SD card, an xD card, a CompactFlash card, etc.), or the like.

Any database discussed herein, unless specified otherwise, may include relational, hierarchical, graphical, distributed ledger, blockchain, object-oriented structure, and/or any other database configurations, unless otherwise specified. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Moreover, a database may be organized in any suitable manner, for example, as data tables or lookup tables. Each record stored in a database may be a single file, a series of files, a linked series of data fields, and/or any other data structure or schema.

Any database, system, device, server, or other components of the system described herein may consist of any combination thereof at a single location or at multiple locations. For example, any database described herein may comprise a single database or a plurality of databases (virtual partitions or physically distinct). Each database or system may include any of various suitable security features, such as firewalls, access codes, encryption, decryption, compression, decompression, and/or the like.

In various embodiments, an "input device" as discussed herein may comprise hardware and/or software used to provide data, inputs, control signals, and the like to a computer-based system, software application, etc. For example, an input device may include a pointing device (e.g., mouse, joystick, pointer, etc.), a keyboard (e.g., virtual or physical), a touchpad or touchscreen interface, a video input device (e.g., camera, scanner, multi-camera system, etc.), a virtual reality system, an audio input device (e.g., microphone, digital musical instrument, etc.), a biometric input device (e.g., fingerprint scanner, iris scanner, etc.), a composite device (e.g., a device having a plurality of different forms of input), and/or any other input device.

In various embodiments, an "output device" as discussed herein may comprise hardware and/or software configured to convert information into a human-accessible form, for display, projection, or physical reproduction. For example, an output device may include a display device (e.g., monitor, monochrome display, colored display, CRT, LCD, LED, projector, video card, etc.), an audio output device (e.g., speaker, headphones, sound card, etc.), a location services system (e.g., global positioning system (GPS), etc.), a printer (e.g., dot matrix printer, inkjet printer, laser printer, 3D printer, wide-format printer, etc.), a braille reader, a composite device (e.g., a device having a plurality of different forms of output), and/or any other output device.

In various embodiments, "satisfy," "meet," "match," "associated with," or similar phrases used herein may include an identical match, a partial match, meeting certain criteria, matching a subset of data, a correlation, satisfying certain criteria, a correspondence, an association, an algorithmic relationship, and/or the like. Similarly, as used herein, "authenticate," "verify," "validate," or similar terms may include an exact authentication, verification, or validation; a partial authentication, verification, or validation; authenticating, verifying, or validating a subset of data; satisfying certain criteria; an association; an algorithmic relationship; and/or the like.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus or system for performing the operations herein. Such an apparatus or system may be specially constructed for the required purpose, and/or it may comprise a general-purpose device selectively activated or reconfigured by a computer program stored in the apparatus or system. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

Examples of various exemplary embodiments embodying aspects of the invention are presented in the following example set. It will be appreciated that all the examples contained in this disclosure are given by way of explanation, and not of limitation.

What is claimed is:

1. A system comprising:

a server comprising one or more processors and a computer-readable medium having instructions embodied thereon, wherein the instructions, in response to execution by the one or more processors, cause the one or more processors to perform first steps comprising:

receiving location data from a plurality of recording devices;

receiving location information associated with a call for service, the location information identifying a location of the call for service;

determining, based on the location of the call for service, a safety radius, the safety radius comprising a first area around the location of the call for service;

identifying one or more recording devices of the plurality of recording devices having location data inside the determined safety radius; and transmitting geofence information to the one or more recording devices, the geofence information corresponding to the location of the call for service; and a recording device configured to perform second steps comprising:

receiving, from the server, the geofence information; and responsive to a current location of the recording device being inside an activation radius determined in accordance with the geofence information, initiating recording of record data, wherein the activation radius comprises a second area around the location of the call for service, the second area smaller than the first area.

2. The system of claim 1, wherein transmitting the geofence information to the one or more recording devices comprises transmitting, by the server, a push notification to the one or more recording devices located inside the determined safety radius.

3. The system of claim 1, wherein transmitting to the geofence information further comprises:

identifying, by the server, a subset of recording devices located inside the determined activation radius; and transmitting, by the server, a push notification to the subset of recording devices.

4. The system of claim 1, wherein the first steps further comprise:

receiving, by the server, second location data indicating a location of a second recording device, the location of the second recording device being outside of the determined safety radius; and transmitting the geofence information to the second recording device responsive to the received second location data.

5. The system of claim 4, wherein the second location data is received after transmitting the geofence information to the one or more recording devices.

6. The system of claim 1, wherein the safety radius comprises a distance of at least 5 miles from the location of the call for service.

7. The system of claim 1, wherein the activation radius comprises a distance of equal or less than 500 meters from the location of the call for service.

8. The system of claim 1, wherein the recording device is further configured to:

determine the current location at a first frequency prior to receiving the geofence information; and responsive to the current location of the recording device being inside the safety radius, determine the current location at a second frequency, wherein the second frequency is higher than the first frequency.

9. The system of claim 1, wherein the call for service comprises call information describing one or more of: a call for service category; a priority level; a time of day; the location of the call for service; or a jurisdiction, and further wherein the safety radius is determined responsive to the call information meeting one or more criteria.

10. The system of claim 9, wherein the one or more criteria comprises at least one of: a minimum priority level; a call for service category type; or a time period.

11. The system of claim 1, wherein the first steps further comprise:

determining a number of the plurality of recording devices having initiated recording associated with the call for service;

responsive to the determined number, modifying at least one of the safety radius or the activation radius to provide an updated radius; and transmitting second geofence information to the one or more recording devices, wherein the second geofence information comprises the updated radius.

12. The system of claim 1, wherein the first steps further comprise determining the activation radius based on the location of the call for service.

13. A method comprising:

receiving, by a server, location data from a plurality of recording devices;

receiving, by the server, a location of a call for service;

determining, by the server based on the location of the call for service, a safety radius, the safety radius comprising a first area around the location of the call for service;

in accordance with the location data from the plurality of recording devices, identifying, by the server, one or more recording devices of the plurality of recording devices located inside the determined safety radius;

transmitting, by the server, a push notification comprising geofence information to the one or more recording devices, the geofence information corresponding to the location of the call for service; and responsive to transmitting the geofence information, receiving, by the server from a recording device of the one or more recording devices, record data associated with the call for service, wherein:

the recording device is located inside an activation radius determined in accordance with the geofence information;

the activation radius comprises a second area around the location of the call for service; and the second area is smaller than the first area.

14. The method of claim 13, further comprising:

after transmitting the push notification, receiving, by the server, location data from a second recording device of the plurality of recording devices, the second recording device different from the one or more recording devices; and responsive to receiving the location data from the second recording device, transmitting a pull notification to the second recording device, the pull notification comprising the geofence information.

15. The method of claim 13, wherein receiving the location data comprises receiving the location data from the plurality of recording devices at a first interval; and after the push notification is transmitted, location data from the one or more recording devices is received from the one or more recording devices at a second interval, the second interval shorter than the first interval.

16. The method of claim 13, wherein transmitting to the geofence information comprises transmitting the push notification to a second recording device of the one or more recording devices, wherein the second recording device is located outside the activation radius.

17. A server comprising one or more processors and a computer-readable medium having instructions embodied thereon, wherein the instructions, in response to execution by the one or more processors, cause the server to perform steps comprising:

receiving location information from a plurality of recording devices, the location information identifying a respective current location for each recording device of the plurality of recording devices;

receiving event information, the event information identifying a location of a call for service;

determining, based on the location of the call for service, a safety radius, the safety radius comprising a first area around the location of the call for service;

in accordance with the respective current location for each recording device of the plurality of recording devices, identifying two or more recording devices of the plurality of recording devices located inside the safety radius, wherein the two or more recording devices comprise less than all of the plurality of recording devices;

establishing, by the server with each recording device of a subset of recording devices of the two or more recording devices, a respective communications channel, the subset of recording devices less than all of the two or more recording devices;

receiving, from each recording device of the subset of recording devices via the respective communications channel, recording data, the recording device having a current location inside an activation radius associated with the location of the call for service, the activation radius encircled by the safety radius;

associating the received recording data with information describing the call for service; and providing, by the server, the received recording data for display.

18. The server of claim 17, wherein receiving the recording data further comprises receiving the recording data via the respective communications channel in real-time.

19. The server of claim 17, wherein the server is configured to perform steps further comprising:

receiving, by the server, location data identifying a respective current location of each recording device of the subset of recording devices; and responsive to the respective current location of the recording device being outside the activation radius, ending the respective communications channel with the recording device.

20. The server of claim 17, wherein the activation radius comprises an expiration time, and wherein the server is configured to perform steps further comprising ending, responsive to the expiration time, the respective communications channel with each recording device of the subset of recording devices.

* * * * *